UNITED STATES PATENT OFFICE.

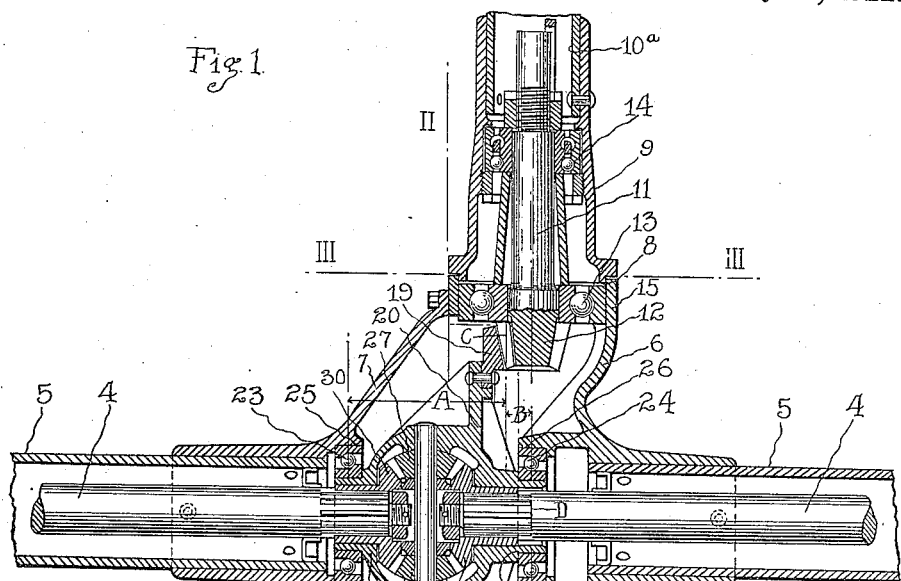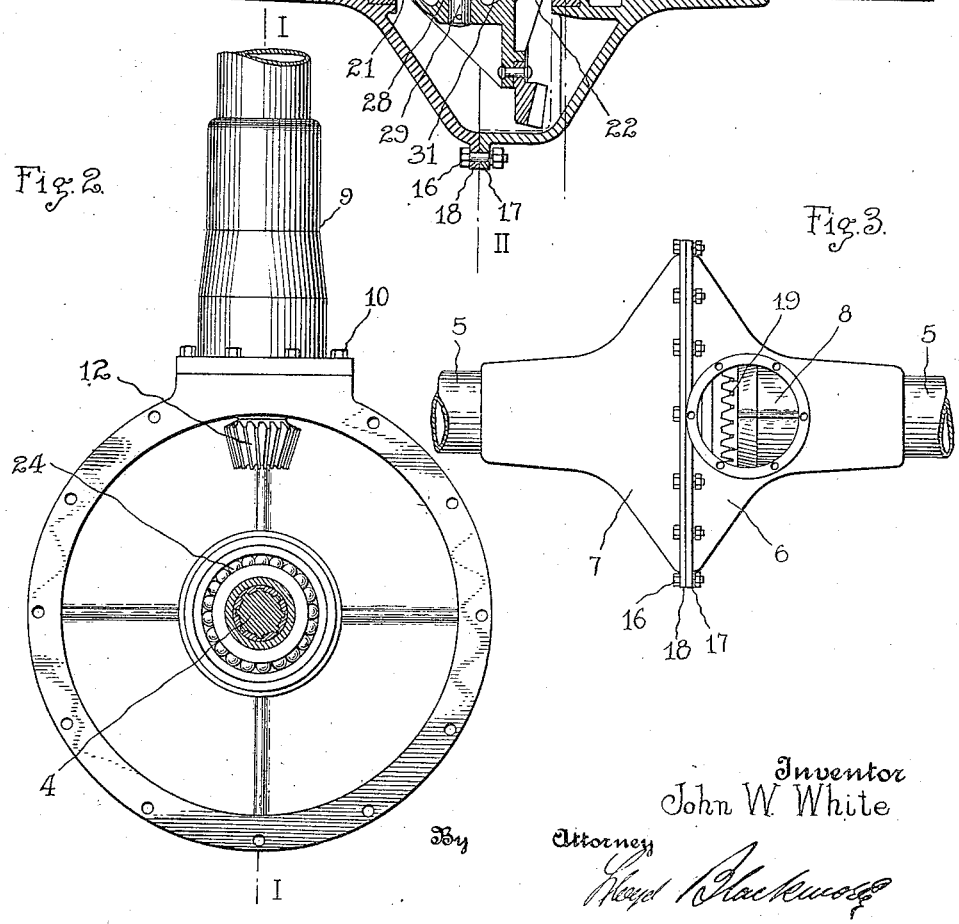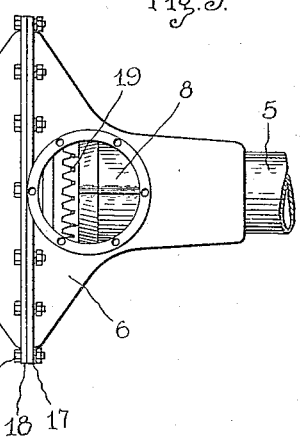

JOHN W. WHITE, OF DETROIT, MICHIGAN.

DIFFERENTIAL DRIVING MECHANISM FOR MOTOR VEHICLES 1,422,401.  Specification of Letters Patent.  Patented July 11, 1922.

Application filed June 10, 1919. Serial No. 303,084.

*To all whom it may concern:*

Be it known that I, JOHN W. WHITE, a citizen of the United States, and resident of Detroit, Wayne County, State of Michigan, have invented certain new and useful Improvements in Differential Driving Mechanism for Motor Vehicles, of which the following is a specification.

My invention relates to differential driving mechanism such as is used with driving axles of automobiles, motor trucks and similar self-propelled vehicles; and more particularly to the form, construction and arrangement relative one to another of the casing members or sections which collectively provide a hollow sectional casing within which the elements of the differential gearing are located and held in proper relation with one another.

The principal object of my invention is to provide a gear casing having features of construction whereby the parts thereof may be more readily manufactured and assembled than has heretofore been the case.

A further object of my invention is to provide a gear casing wherein the differential gearing may be more readily assembled within the same and adjusted relative to the driving shaft and driving pinion than is the case in prior constructions.

A further object of my invention is to provide differential driving mechanism wherein the total loads borne by the two bearings which support the rotatable differential pinion housing or carrier are more nearly equalized than has usually been the case heretofore; to the end that the two bearings which support said member when of the same size, as is desirable, will be equally loaded and will perform the same service when in use.

A further object of my invention is to provide a gear casing wherein such errors or variations in dimensions as may be present in the members which collectively form the casing, due to lack of uniformity in machining the said parts, will have a minimum effect in disturbing the proper relation between the driving pinion and the driven gear of the differential gearing; and will in no way interfere with the driving action or the meshing of said gears with one another.

With the above and other objects in view, my invention consists in the improved differential driving mechanism illustrated in the accompanying drawing, described in the following specification, and particularly claimed; and in such variations and modifications thereof, within the scope of the concluding claims, as will be obvious to those skilled in the art to which my invention relates.

In the drawing accompanying and forming a part of this application, and wherein a preferred embodiment of my invention is illustrated:

Figure 1 is a view showing a section of my improved differential gear driving mechanism housing upon a central plane indicated by the line I—I, Figure 2;

Figure 2 is a view showing a section taken upon a transverse plane indicated by the line II—II, Figure 1;

Figure 3 is a view upon a smaller scale showing the differential gear casing as seen from a position in the plane III—III, Figure 1, looking down with reference to said figure, or looking toward the rear axle regarding the casing in the position in which it occupies in a vehicle.

Referring to the drawing, the reference numerals 4 designate the two driving axles of an automobile, motor truck, or similar self-propelled vehicle; such axles being located within tubes 5 extending from the wheels of the vehicle inward, and the inner ends of which are connected with the two casing members or sections 6, 7 which together form the gear casing or housing within which the differential gear mechanism of my invention is located.

The casing or housing for the differential gear mechanism made up of the casing members 6, 7 is divided upon a transverse plane extending at or substantially at right angles to the axes of the axles 4, the position of which plane is indicated by the line II—II, Figure 1; and the right-hand casing member 6 is provided with an opening 8 within which the rear end of a third casing member or section 9 is secured, the section 9 being held in place relative to the section 6 by means of bolts 10 or equivalent fastening devices and being supported wholly by the member 6, as will be appreciated.

The section 9 is connected with a torque tube 10ª within which the driving shaft 11 of the vehicle is enclosed, the forward end of said driving shaft being operatively connected with the engine or other motor, and the rear end thereof having a driving pinion 12 through which motion is communicated to the differential gearing and to the axles of the vehicle.

The rear end of the driving shaft 11 is supported in suitable bearings 13, 14, the former of which is shown as located within the neck 15 of the casing member 6 which receives the end of the third member 9, while the latter bearing is located within the third casing section 9. The particular arrangement and location of the bearings, however, is of secondary importance, and may be varied, and it will be appreciated that they may be of a type other than of the ball-bearing type illustrated.

It will be appreciated from the above description that the opening 8 within which the end of the casing section 9 at the rear end of the torque tube 10ª is secured, is located entirely within the right-hand casing section 6 of the gear housing; and that the left-hand casing member 7 of said housing is in no way involved with the provisions of an opening for receiving the casing section 9, nor with the securing of said casing section to the housing of the differential gear when the parts are assembled or with the support of said third casing member.

The casing section 7 is a simple conical structure having a passage within which the inner end of the axle tube 5 is secured, and said section is secured to the section 6 of the gear housing by means of bolts 16 spaced about its periphery and extending through peripheral flanges 17, 18 of the two casing members, the joint between the casing sections thus being in a plane at or substantially at right angles to the axles 4.

The differential gear mechanism through which the axles 4 are driven from the driving shaft 11 is located within the gear casing provided by the casing members 6, 7; and said gearing comprises a driven bevel ring gear 19 in mesh with the driving pinion 12, and which ring gear in turn is secured to and carried by a rotatable differential pinion carrier 20 the hubs or ends 21, 22 of which are supported by bearings 23, 24 and which bearings in turn are supported in seats 25, 26 provided within the casing members 6, 7 respectively, said bearings being shown of the ball type, although they may obviously be of any form.

Carried by and rotating with the differential gear carrier 20 are bevel pinions 27, 28 rotatable freely upon a transversely extending shaft 29, said pinions being in mesh with gears 30, 31 having driving engagements with the inner ends of the axles 4; the gears 27, 28, 30 and 31 constituting an ordinary form of differential gearing through which the axles 4 are driven from the main driving shaft 11 and driving pinion 12 through the ring gear 19.

The driving shaft 11 extends at right angles to the axles 4, and its axis of rotation lies in a plane transverse to said axles and extending through the bearing 24; and the ring gear 19 is offset so as to position the separate gears of the differential gearing to one side of the axis of the main driving shaft. This location of the bearing for the right-hand end or hub 22 of the differential pinion carrier 20 in line with the axis of the driving shaft permits the carrier and ring gear 19 as a whole to be tipped about the said bearing without interfering with the driving action of the pinion 12 upon the ring gear, as the bevelled teeth on both the pinion and gear converge toward a common centre located in the axis of the driving shaft and of the axles 4. Such slight tipping as may occur, because of looseness or lack of absolute registry at the holes in the flanges 17, 18, through which the bolts 16 pass, and, as will be appreciated, such tipping as may occur due to inaccuracy in machining the parts, will have no effect so far as concerns the driving action between the pinion and ring gear; the only effect of such tipping of the differential pinion carrier or of the accompanying lack of correct alignment in the axles being to vary the back-lash between the pinion and gear.

Heretofore in machining differential gear casings divided upon a plane transverse to the driving axles, the opening for the third member of the casing to which the rear end of the torque tube is connected has been formed partly in one and partly in the other of the casing members or sections; and the usual practice has been to bolt the two parts of the casing together, and then line up the casing as a whole in such a way that the axis of the opening to be provided for receiving the third part will be at right angles to the axis of the bearing seats provided for the ends of the differential pinion carrier, and properly positioned laterally relative to said bearings, so that the driving pinion and ring gear will mesh properly in the finished device. This has been an extremely troublesome method of procedure, because of the fact that the parts of the gear casing have no finished plane surfaces from which to work in lining up the casing, and because of the further fact that the internal seats or recesses provided for the bearings which support the differential pinion carrier are within the casing members, and thus inaccessible.

As distinguished from the above and in the casing to which this application relates, the opening for the third casing member 9 is located entirely in one of the two parts of the casing, that is, entirely in the section 6 thereof, and is supported entirely by said last mentioned casing member. It therefore follows that the machining operations necessary in order to provide the opening for the said section, as well as the operations necessary for providing a seat for the bearing 13 for the end of the driving shaft in the embodiment of my invention illustrated, are performed entirely upon one only of the casing members, and without bolting the two sections together as a step preliminary to the provision of the opening in question The finishing operations necessary to be performed on the casing section 6 in which the opening aforesaid is provided are simple in character, such operations comprising: first, the facing of the flange 17 and the formation of the seat 26 for the bearing 24 upon a suitable machine tool, after which the section is secured to the plane surface or table of a machine having a boring tool rotatable about an axis extending parallel with said plate or table; the finished plane surface of the flange 17 thus serving in effect as a surface to work from, and ensuring the axis of the opening provided for the third casing member which is finished by the last mentioned boring tool will be parallel with the plane of the flange and at right angles to the axis of the bearing seat 26. Such an arrangement of table and rotating boring tool is present in the ordinary milling and similar machines, as will be appreciated; and the provision of the opening for the third casing member entirely in one of the two main casing members obviously permits the opening in question to be readily formed by securing the flange of the member 6 to the table of the machine, the finished surface of the flange obviously providing a surface from which to work, and ensuring the proper relationship between the axis of the opening and the axis of the seat for the bearing 24.

It will be further appreciated that the differential gear mechanism may be assembled properly relative to the driving pinion without the casing member 7 being in place, the free left-hand end of the differential pinion carrier 20 being supported in such a case in a temporary bridge or support secured to the flange 17. This is a feature of importance in assembling differential gearing of the class described, as it enables the gearing to be adjusted in such a way that the driving pinion and ring gear mesh properly with one another, and provides a scheme whereby the position of the gears relative to one another may be observed by the person who is assembling the gearing in order to secure a proper action between the gears in question. The bridge will of course be so positioned upon the flange as to hold the left-hand end or hub of the carrier in the same relative position which it will occupy when the section 7 is in place, so that after the temporary support has been removed and the casing section 7 put in place and secured to the section 6, the parts will occupy the same position as that in which they have been adjusted in assembling the gear.

It will be appreciated that the action of the driving pinion 12 upon the ring gear 19 is resolved into a force acting tangential to the periphery of said gear, and a second force, due to the action of the inclined side or working faces of the teeth of the pinion and gear upon one another, acting laterally and tending to force the differential pinion carrier 20 to the left; thereby producing thrust stresses or a thrust load which is resisted and borne entirely by the bearing 23, no thrust stresses being transmitted to the other bearing 24 of the differential pinion carrier.

The tangential component of the force transmitted to the ring gear 19 through the driving pinion results in stresses acting radially, and in planes at right angles to the axes of the axles 4, at the bearings 23, 24, thereby imposing radial loads upon the said bearings; the distribution between the two bearings of the radial stresses due to the tangential component aforesaid, as well as of the stresses due to the action of the lateral or thrust component acting through the ring gear as a lever arm to tip the pinion carrier about the bearings 23, 24 as fixed fulcrums, being dependent upon the distances, indicated by the lines A and B, between the transverse planes of the bearings and a transverse plane C passing through the cooperating teeth of the driving pinion and ring gear; and it is obvious that the greater the distance B, the less will be the part of the total radial load borne by the bearing 24, and vice versa.

My invention contemplates an equalization of the loads borne, respectively, by the two bearings 23, 24, so that the thrust plus the radial load at the bearing 23 will be approximately equal to the radial load at the bearing 24; thereby providing a construction wherein bearings of the same size, and which when in use will be subjected to loads more nearly equal one to the other than has heretofore ordinarily been the case, may be used at the ends of the two hubs 21, 22 of the differential pinion carrier 20. This end is accomplished by so constructing and arranging the parts that the transverse plane C of the ring gear is nearer the transverse plane of the bearing 24 than to that of the bearing 23; thus increasing the portion of the total radial load borne by the bearing 24 and reducing the load upon the bearing 23, and equalizing the loads to which the two bearings are subjected. The precise location of the planes of the ring gear and of the bearings relative to one another may be varied without departing from my invention, and will ordinarily vary in axle construction designed by individual designers for different services.

Likewise the position of the plane of the bearing 24 may be varied without materially interfering with the equalization of the load borne by the two bearings, which is determined by the location of the plane of the ring gear relative to the planes of said bearings, if the position of the plane of the bearing 23 is correspondingly varied. I prefer, however, that the arrangement of the parts shall be such that the axis of the driving shaft will lie in the plane of the bearing 24 as in that case the teeth of the pinion and ring gear converge toward a common point D about which the transmission gearing as a whole will be tipped as hereinbefore mentioned if for any reason, as because of looseness at the bolts 16, the two driving axles should not be brought into perfect alignment in assembling the axle as a whole. Such lack of alignment in a construction wherein the axis of the driving shaft is in the plane of the bearing, or a tipping of the ring gear about the point D due to other causes, will have no other effect than to vary the back-lash or looseness between the gears; whereas, if the ring gear and differential pinion carrier was tipped about a point not coincident with the point toward which the teeth in question converge, the gears would no longer mesh properly, and the driving action would be seriously interfered with by a comparatively slight lack of axial alignment of the bearings 23, 24.

Having thus described and explained my invention, I claim and desire to secure by Letters Patent:

1. In differential driving mechanism of the class described, a hollow gear casing comprising two casing members secured together along a joint lying in a plane at right angles to the driving axles, and each of which members is provided with a bearing; differential gearing located within said casing and comprising a rotatable carrier or housing having a hub at each of its ends, and which hubs are supported by said bearings; driving axles driven through said differential gearing; a third casing member separate from and secured to one only of said first mentioned casing members; a driving shaft located within said third casing member and which driving shaft is disposed at right angles to said driving axles and the axis of which is in line with one of the bearings aforesaid; a driving pinion carried by said driving shaft; and a ring gear carried by said carrier and with which said driving pinion is in mesh.

2. In differential driving mechanism, in combination, two driving axles arranged in line with one another, a hollow gear casing comprising two casing members secured together, and one of which members is provided with an opening formed entirely in said member, two bearings located one within each of said casing members; a rotatable differential pinion carrier located within said casing and the ends of which are supported in said bearings; differential gearing through which said axles are driven from said carrier; a third casing member secured in place over, and so as to register with said opening; a driving shaft located within said third casing member and arranged at right angles to said driving axles and the axis of which is in line with one of the bearings aforesaid; a driving pinion carried by said driving shaft; and a driven ring gear carried by said carrier and with which said driving pinion is in mesh.

3. In differential driving mechanism of the class described and in combination, two driving axles arranged in line with one another; a hollow gear casing comprising two casing members secured together along a joint which lies in a plane at right angles to said axles, and each of which members is provided with a bearing; a driving shaft disposed at right angles to said axles and the axis of which is in line with one of the bearings aforesaid; a third casing member enclosing said driving shaft and which member is separate from and is secured to one only of said first mentioned casing members; a torque tube enclosing said driving shaft and the rear end of which is secured to said third casing member; a rotatable differential pinion carrier located within said casing and supported by said bearings; differential gearing through which said axles are driven from said carrier; a driving pinion carried by said driving shaft; and a driven gear carried by said carrier and with which said driving pinion is in mesh.

In testimony whereof I affix my signature.

JOHN W. WHITE.